Aug. 23, 1927.

J. E. JOHNSON

1,639,733

EMBOSSING MACHINE

Filed Feb. 8, 1923

Patented Aug. 23, 1927.

1,639,733

UNITED STATES PATENT OFFICE.

JOHN E. JOHNSON, OF CHICAGO, ILLINOIS, ASSIGNOR TO THE SPEEDAUMATIC COMPANY, OF CHICAGO, ILLINOIS, A CORPORATION OF DELAWARE.

EMBOSSING MACHINE.

Application filed February 8, 1923. Serial No. 617,740.

This invention relates to machines for embossing addresses or other desired characters upon sheet metal in the form of address plates or the like.

A particular object of this invention is to provide a comparatively simple mechanism which may be easily operated by hand and which at the same time is adaptable with but few changes in construction to be converted into a power operated machine.

A further object of this invention is to provide a mechanism of the type above indicated, which is convenient in operation and which is of sufficient durability to possess a long life even when subjected to mechanical abuse.

Further objects will appear upon reference to the following description and accompanying drawings, in which—

Figure 1:
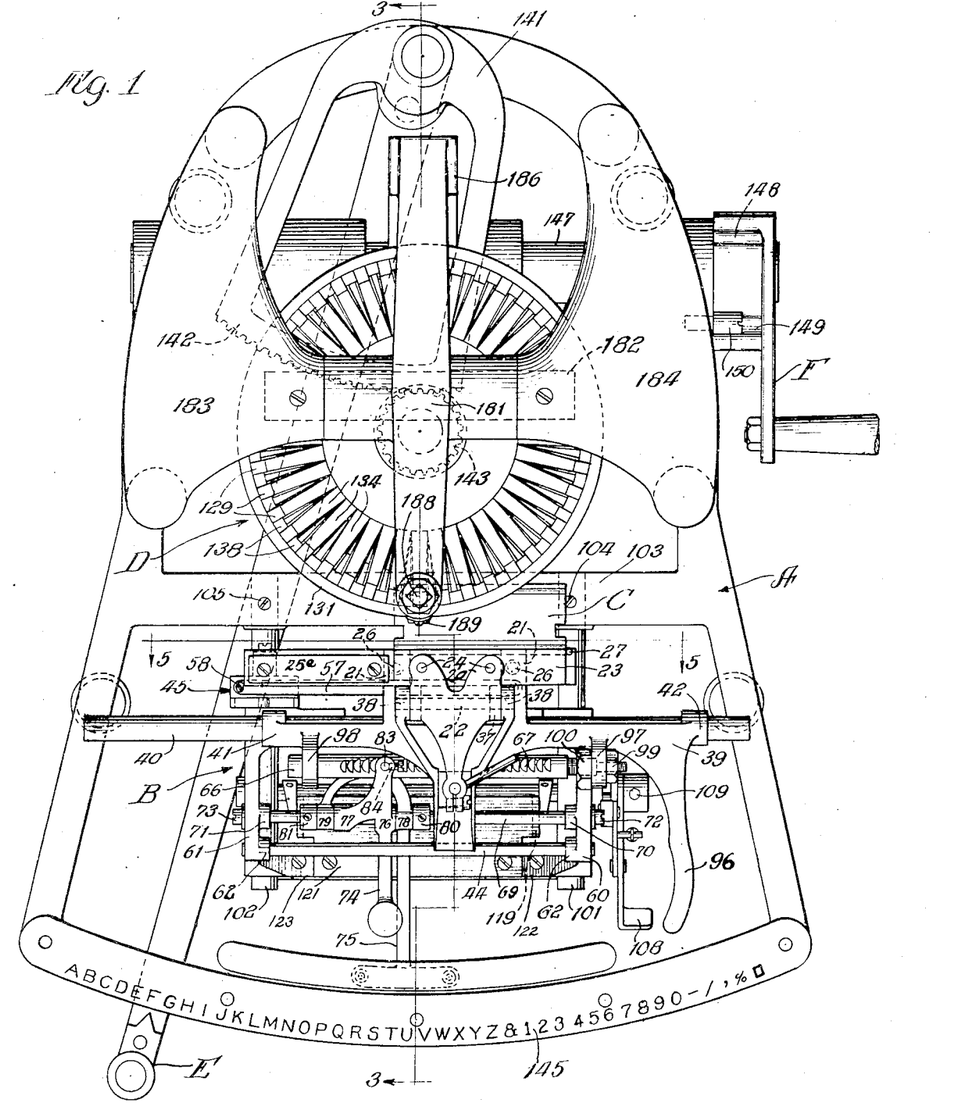
Figure 1 is a plan view of a form of hand operated machine.

The machine of Fig. 1 comprises in a general way a frame member —A—, an address plate carriage mechanism —B— for properly positioning and holding an address plate or other plate —C—, which is to be embossed, a die holding disc mechanism —D—, which is rotated to its various actuating positions by a lever —E— and the dies of which are actuated by a crank —F—.

Figure 3:
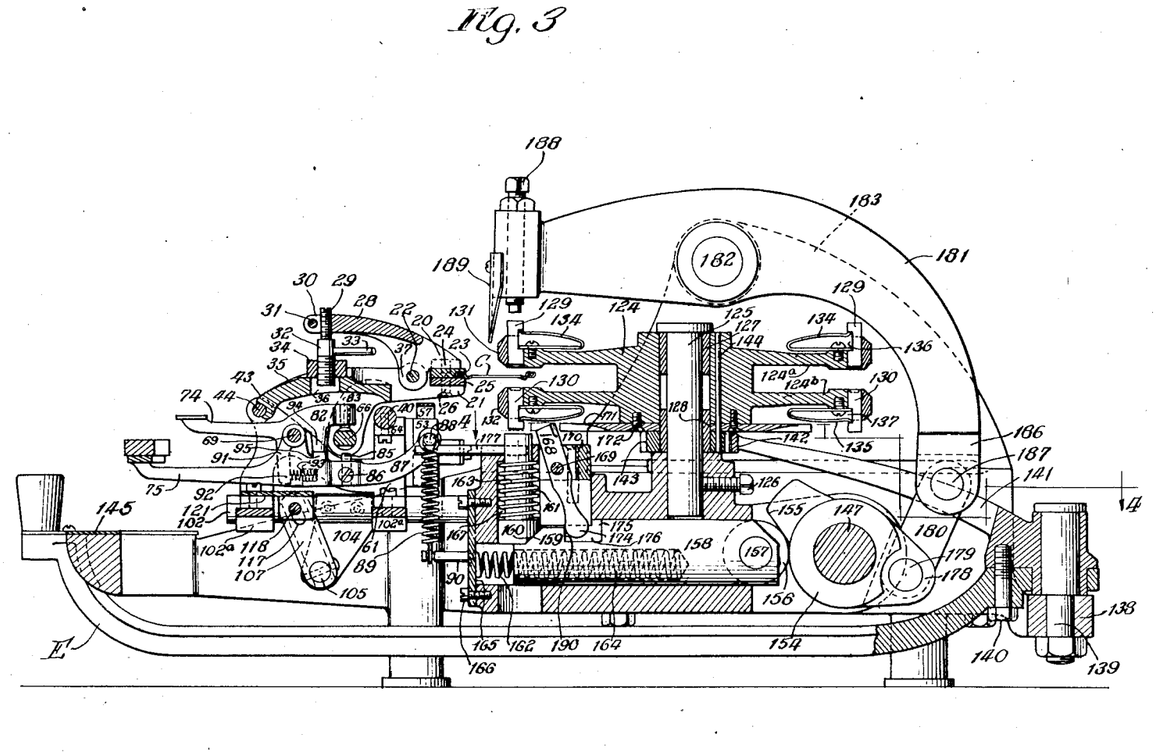
Fig. 3 is a vertical sectional view substantially on the line 3—3 of Fig. 1.
Figures 4, 5, 6, 7:
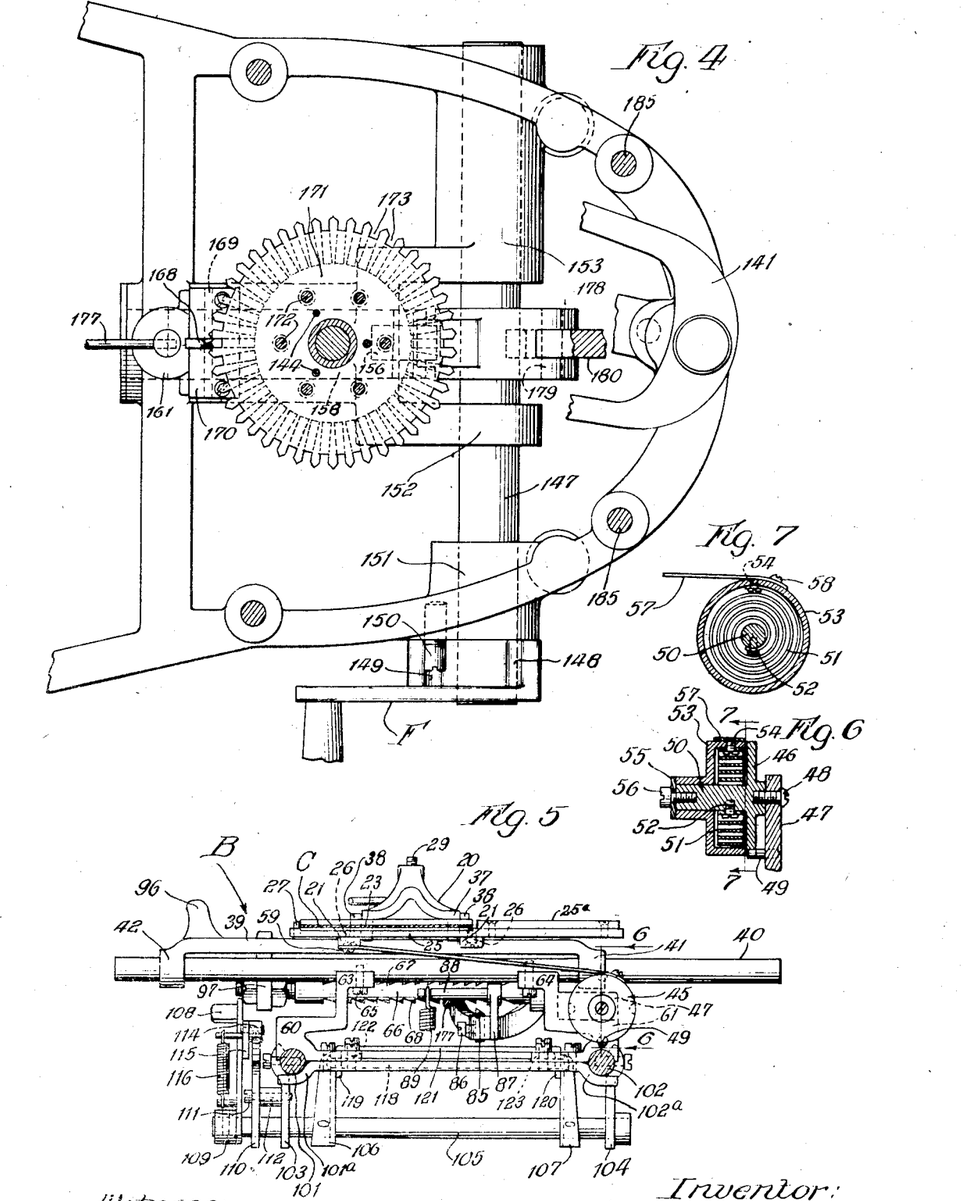
Fig. 4 is a sectional plan view substantially on line 4—4 of Fig. 3.
Fig. 5 is a vertical sectional view on the line 5—5 of Fig. 1.
Fig. 6 is a sectional view on line 6—6 of Fig. 5.
Fig. 7 is a sectional view on the line 7—7 of Fig. 6.

The address plate carriage mechanism will first be described. As best indicated in Figs. 1, 3 and 5, the blank address plate —C— is inserted and clamped in jaws 20 and 21 which are pivoted together upon a shaft 22. As shown in Fig. 1, the jaw 20 comprises a bifurcated member to which a face plate 23 is fixed by screws 24 and which is clamped upon the address plate —C—. The lower jaw member 21 comprises a somewhat similar bifurcated member upon which a face plate 25 is attached by screws 26. The address plate —C— rests upon the top of the face plate 25 and against the positioning pin 27 mounted at the end of the face plate. The face plates 23 and 25 are made to conform to the shape of the particular type of address plates which are clamped therebetween. The face plate 25 may be provided with a guide bar 25ᵃ by which the address plates may be guided and quickly slid into the space between the clamping jaws. The jaw member 20 extends back to the opposite side of the shaft 22 in the form of a lever 28 and forms a support for a jack-screw bearing 29 (Fig. 3). The bearing 29 consists of an adjustable screw inserted in a slotted opening 30, the slotted opening being adjustable by a clamping screw 31 which serves to clamp the bearing 29 securely in position when adjusted at the desired elevation. A jack-screw 32 provided with a handle 33 for tightening the clamping jaws bears upon the under side of the bearing 29 and is provided with a washer 34 resting upon an extended portion 35 of the jaw member 21, which is provided with an opening 36 for the jack-screw at this point. The jaw members 20 and 21 are provided, respectively, with a pair of lugs 37 and 38, which embrace the pivoting shaft 22.

As shown in Fig. 1, the jaw member 21 forms an extension to a carriage frame 39, which is slidably mounted upon a rod 40 by end lugs 41 and 42. The extended portion 35 of the jaw member 21 is also formed integral with the carriage frame 39 and serves as a support therefor, through the medium of a sliding bearing 43 resting upon a rod 44.

A spring mechanism indicated in Fig. 1 at 45 and shown in detail in Figs. 6 and 7 tends to always draw the carriage frame 39 toward the left in Fig. 1. This spring mechanism comprises a frame member 46, attached to a lug 47 forming a part of the carriage mechanism, by a screw 48 and is kept from revolving about this screw by a peg 49 inserted in the lug. The frame 46 is formed with a shaft member 50 upon which a spiral spring 51 of ribbon form is attached at its inner end by a screw 52. The spiral spring 51 is enclosed in a housing member 53 fitting around the shaft 50. The housing is attached by a screw 54 to the outer end of the spiral spring. The housing 53 is retained upon the shaft 50 by a washer 55 and a screw 56. A flexible metallic strip 57 has one end attached to the exterior of the housing 53 by a screw 58 and has its other end attached by a screw 59 to a portion of the bifurcated jaw member 21. It will thus be seen that the spiral spring 51 will tend to wind the strap 57 around the housing 53 and thus tend to draw the carriage frame 39 toward the left.

The mechanism will now be described whereby the carriage frame 39 may be longitudinally adjusted or advanced in order to provide the proper letter spacing upon the address plate —C— as the characters are embossed thereon. The entire carriage mechanism is mounted upon side frames 60 and 61, which are provided with bosses 62 for receiving the shaft 44 and with seating portions 63 and 64 for seating the rod 40, which is fixed in place by screws as at 65 (Fig. 5). The side frames 60 and 61 also serve to support a rack rod 66, having an upper rack 67 and a lower rack 68. A shaft 69 is fixed in the side frames 60 and 61 at bosses 70 and 71 and is removably retained therein by screws 72 and 73, respectively. The shaft 69 serves as a pivot for a carriage releasing lever 74 and a spacer lever 75 which are provided respectively with lugs 76, 77, 78 and 79, respectively, which embrace the shaft 69. These levers are retained in their proper position upon the shaft 69 by collars 80 and 81. The carriage releasing lever 74 is provided with an extension 82, having a stop pin 83 fixed therein by a screw 84 for engaging the upper rack 67 and for thus normally holding the carriage in a stationary position against the force of the spring 51.

The spacer lever 75 is also provided with a stop pin 85 fixed therein by a screw 86 and for engaging the lower rack 68. The spacer lever 75 is also extended to form an arm 87 serving to mount a peg 88, to which is attached one end of a coil spring 89, the other end of which is attached to a peg 90 fixed to a portion of the frame —A— (Figs. 3 and 5). The coil spring 89 serves to hold the stop pin 85 in its down position out of contact with the lower rack 68. The releasing lever 74 is provided with a downwardly extending lug 91, which bears against a spiral compression spring 92, which is contained in a recess 93 within the spacer lever 75. The two levers 74 and 75 are provided with coacting bosses 94 and 95, which are held in contact with each other at all times by the force of the spring 92 (see Fig. 3).

The carriage frame 39 is provided with an extension 96 forming a handle for drawing the carriage member to the right against the force of the spring 51 for the beginning of a new line of characters upon the address plate —C—.

With the above described structure it will be seen that by depressing the releasing lever 74, the stop pin 83 is withdrawn from the upper rack 67 thereby releasing the carriage frame 39, which will now be free to be drawn to the left (Fig. 1) by the force of the spring 51, or, if desired, the carriage may now be adjusted to a desired position by means of the handle 96 thereon. If it is desired to move the carriage to the left for one space only at a time, the spacer lever 75 may be depressed and because of the coaction of the bosses 94 and 95, the stop pin 83 will be disengaged from the upper rack 67 and the stop pin 85 will be elevated into contact with the lower rack 68. To facilitate this action the stop pin 85 may be located in a position approximately three to five thousandths of an inch to the right of the stop pin 83 (in Fig. 5). As the spacer lever 75 is released, the spring 89 will restore the lever to its normal position and will withdraw the stop pin 85 from the lower rack and the stop pin 83 will drop into the next tooth on the upper rack, thus permitting the advance of the carriage frame 39 for a distance equal to the spacing between two teeth upon the upper rack 67.

The rack rod 66 is shown mounted in a manner to be longitudinally adjustable in lugs 97 and 98 by means of nuts 99 and 100 positioned at each side of the lug 97 and which engage corresponding threaded portions at one end of the rod. This permits an exact longitudinal adjustment of the carriage frame and thus also of the address plate —C—, even after it has been clamped in place.

The carriage frame 39 is limited in its travel along the rod 40 by the engagement of the lugs 41 and 42 with the seating portions 63 and 64 of the side frames 60 and 61, as is shown in Fig. 5.

The means by which the carriage mechanism —B— is adjusted to obtain the proper spacing between lines upon the address plate —C— will now be described.

Figure 2:
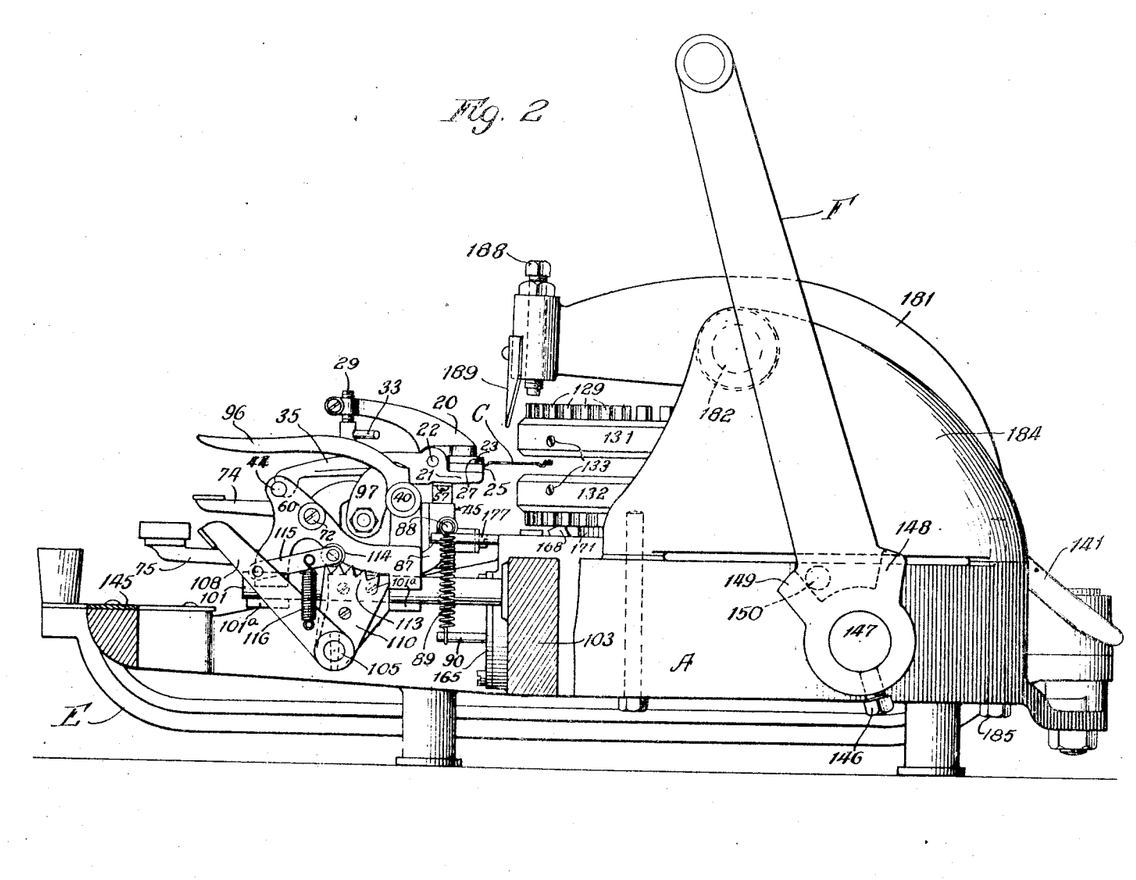
Fig. 2 is a side elevation view looking toward the right of the machine, as shown in Fig. 1 and having certain parts broken away to show the mechanism more clearly.

The side frames 60 and 61 are slidably mounted upon rods 101 and 102, which are fixed in a cross piece 103 formed in the frame —A— and are secured therein by screws 104 and 105. Clamping members 101$^a$ and 102$^a$ serve to hold the side frames 60 and 61 in position upon the rods 101 and 102. Secured to the rods 101 and 102 respectively, are depending lugs 103 and 104 at the lower ends of which is rotatably mounted a shaft 105, having crank levers 106 and 107 riveted thereto. The shaft 105 may be rotated by a handle 108 fixed thereto by a pin 109. A plate 110 is mounted upon the shaft 105 and is fixed to the depending lug 103 by a screw 111 and a spacing collar 112 (Figs. 2 and 5). The plate 110 is provided at its upper end with a plurality of teeth 113, (Fig. 2) which are engaged by a roller 114 mounted upon a link 115, which in turn is pivoted upon the handle 108. The roller 114 is kept in contact with the teeth 113 by a coiled tension spring 116, attached at one end to the link 115 and at the other end to the handle 108.

The movement of the roller 114 over each of the teeth 113 corresponds to the movement of the address plate —C— from line to line as the address plate is being embossed. The crank levers 106 and 107 are provided at their upper ends with slots as at 117 (Fig. 3), through which passes a pin 118 fixed in lugs 119 and 120, (Fig. 5), formed upon a plate 121. The plate 121 is attached to lugs 122 and 123 formed respectively upon the side frames 60 and 61. It will thus be seen that when the lever 108 is operated, the shaft 105 serves to rotate the crank levers 106 and 107 through a small angle, which in turn serve to slide the side frames 60 and 61 longitudinally along the supporting rods 101 and 102. In this manner the proper line spacing upon the address plate —C— may be obtained.

The die-holding disc mechanism —D— will now be described. As appears from Fig. 3, a double die-holding disc 124 is rotatably mounted upon a shaft 125 fixed in the frame —A— by a set screw 126. The shaft 125 is surrounded by a pair of bushings 127 and 128 which receive the disc 124. The bushings 127 and 128 form removable collars which may be replaced when they become worn to an extent which would render the positioning of the die-holding disc inaccurate.

Each die-holding disc is provided around its periphery with a series of dies 129 and 130 formed to represent the letters of the alphabet or other characters which are to be embossed upon address plate —C—, the dies being retained in place by ring members 131 and 132, fixed to the die-holding disc as by screws 133 (Fig. 2). Spring members as at 134 and 135 fixed by screws to the die-holding discs are formed in a U-shape with each leg in contact with an end wall of vertical slots as at 136 and 137 formed in each of the dies. The dies of each disc are separated from one another by spacing blocks as at 138 (Fig. 1). As indicated in Fig. 3, the positive die members 129 are placed in an upper die-holding disc 124$^a$ and serve to downwardly emboss characters in the address plate —C— into the negative dies 130 supported on a lower die-holding disc 124$^b$.

The die-holding disc 124 is rotated in order to bring the desired character into actuated position by means of the lever —E—, which is pivoted at a lug 138, extending from the back portion of the frame —A— and fitted with a pin 139. The lever —E— is also fixed by a screw 140 to a gear segment yoke 141, also pivoted on the pin 139 and having a gear segment 142 coacting with a pinion 143 which is fixed to the die-holding disc by pins 144 (Fig. 4). As the lever —E— is placed opposite the desired character on an indicating dial 145, the die-holding discs are at the same time turned so that the desired character is in its actuating position at the address plate —C—.

When the die having the desired character becomes properly positioned, as above described, it is desirable to lock the die-holding disc 124 in position while the die is being actuated and to also advance the address plate carriage —B— into the proper position for embossing the next character. The mechanism for accomplishing these results will now be described.

The actuating crank —F— is fixed by a set screw 146 upon a rotatable shaft 147 mounted in the frame —A— and serves to rotate the shaft through a small angle limited by stops 148 and 149 upon the crank —F— which engage stop screw 150 fixed in the frame —A—. The shaft 147 is mounted in bearings 151, 152 and 153 formed upon the frame —A— (Fig. 4). A cam member 154 is mounted upon the shaft 147 and has a cam surface 155 for coacting with a roller 156 mounted upon a pin 157 fixed in the end of a plunger member 158, which is slidably mounted in a portion of the frame —A—.

The plunger member 158 is provided with an inclined cam surface 159 coacting with a corresponding cam surface 160 upon a vertical plunger member 161, which is also mounted in the frame —A—. The plungers 158 and 161 are normally retained in the positions indicated in Fig. 3 by the coiled compression springs 162 and 163, respectively, the spring 162 being enclosed in the recess 164 in the plunger 158 and acting against a plate 165 fixed to the frame —A— by screws 166. The spring 163 surrounds the plunger 161, which is together with the spring, positioned in a recess 167 formed in the frame —A—.

A locking lever 168 pivoted upon a pin 169 fixed in a removable portion 170 of the frame —A— serves to engage a disc 171 fixed to the die-holding disc 124. The disc 171 is attached to the die-holding disc by screws 172 and has at its periphery a number of slots 173 (Fig. 4), equal to the number of dies or characters upon the die-holding discs. The lower end of the locking lever 168 is provided with an extension 174, which is acted upon by a wall 175 of a slot 176 in the plunger member 158 when the plunger is moved into actuating position. The movement of the extension 174 in a direction to the left in Fig. 3, swings the locking lever 168 into engagement with one of the slots 173 in the disc 171 and thus serves to lock this disc and the dies of the desired character in their actuating position.

As cam surface 159 is moved to the left in Fig. 3, it coacts with the cam surface 160 and raises the plunger 161 into contact with the negative die 130 and serves to raise this die into actuating position against the force of the coiled spring 163 and the die-holding spring, such as at 135. At the same time a pin 177, mounted in the upper end of the plunger 161, makes contact with the under side of the pin 88, above described, and thereby serves to depress the spacer lever 75 in order to permit the carriage frame 39 to advance one space with each actuation of the dies as will be readily understood.

The cam member 154 is provided with a lug 178 having a pin 179 mounted therein for the connection of a link 180, which serves to operate a lever 181. The lever 181 is pivotally mounted upon a shaft 182, which in turn is mounted upon a pair of supporting frames 183 and 184, fixed to the frame —A— by screws as at 185. The lever 181 is provided at its lower end with a yoke 186, in which is mounted a pin 187, to which the link 180 is connected. The upper end of the lever 181 is provided with an adjustable screw 188, for contacting with the positive die 129.

As the crank —F— is drawn toward the operator, the link 180 is elevated by the cam member 154, thus raising the attached yoke 186 of the lever 181 and lowering the opposite end of the lever 181 into contact with one of the positive dies 129. The die is thus driven downward against the force of the die-retaining spring 134 into contact with the address plate —C— and the desired character is thus embossed upon the plate. At the same time, the cam surface 155 serves to actuate the plungers 158 and 161, above described, in order to bring the negative die 130 up against the lower side of the address plate —C—. As the screw 188 is lowered into contact with the die 129, a guard 189 mounted upon the end of the lever 181 serves to prevent injury to the operator, in case he should accidentally place his hand near these coacting parts.

As the crank —F— is released by the operator, the coiled spring 162 serves to restore the plunger 158 to its normal position and thus also restores the cam member 154 and the associated link 180 and lever 181 also to their normal positions. At the same time, the lower end 174 of the locking lever 168 comes into contact with an end wall 190 of slot 176 and thus the lever 168 is unlocked from the disc 171. The die-holding springs as 134 and 135 serve to restore the positive and negative dies, respectively, to their normal positions. The mechanism is now in condition to be again operated to emboss the next character upon the address plate —C—.

In order to adapt this type of machine to power operation, the operating handle —E— is replaced by a similar handle —E'— (Fig. 8) pivoted at 191 to a yoke member 192, which in turn is pivoted at 193 in a manner similar to the method by which the lever —E— in the device above described, is pivoted at this point. The yoke member 192 is provided with a fork 194 embracing the lever —E'—. The fork 194 permits the yoke 192 and the attached segment yoke 141 to be turned by the handle —E'—. In an operation of this type, the lever —E'— is moved over a character dial at 195 to the desired character and is then depressed into the nearest adjacent notch, as shown at 196, so that an index pointer 197 engages the notch and thus holds the lever —E'— securely in the desired position.

Figure 8:
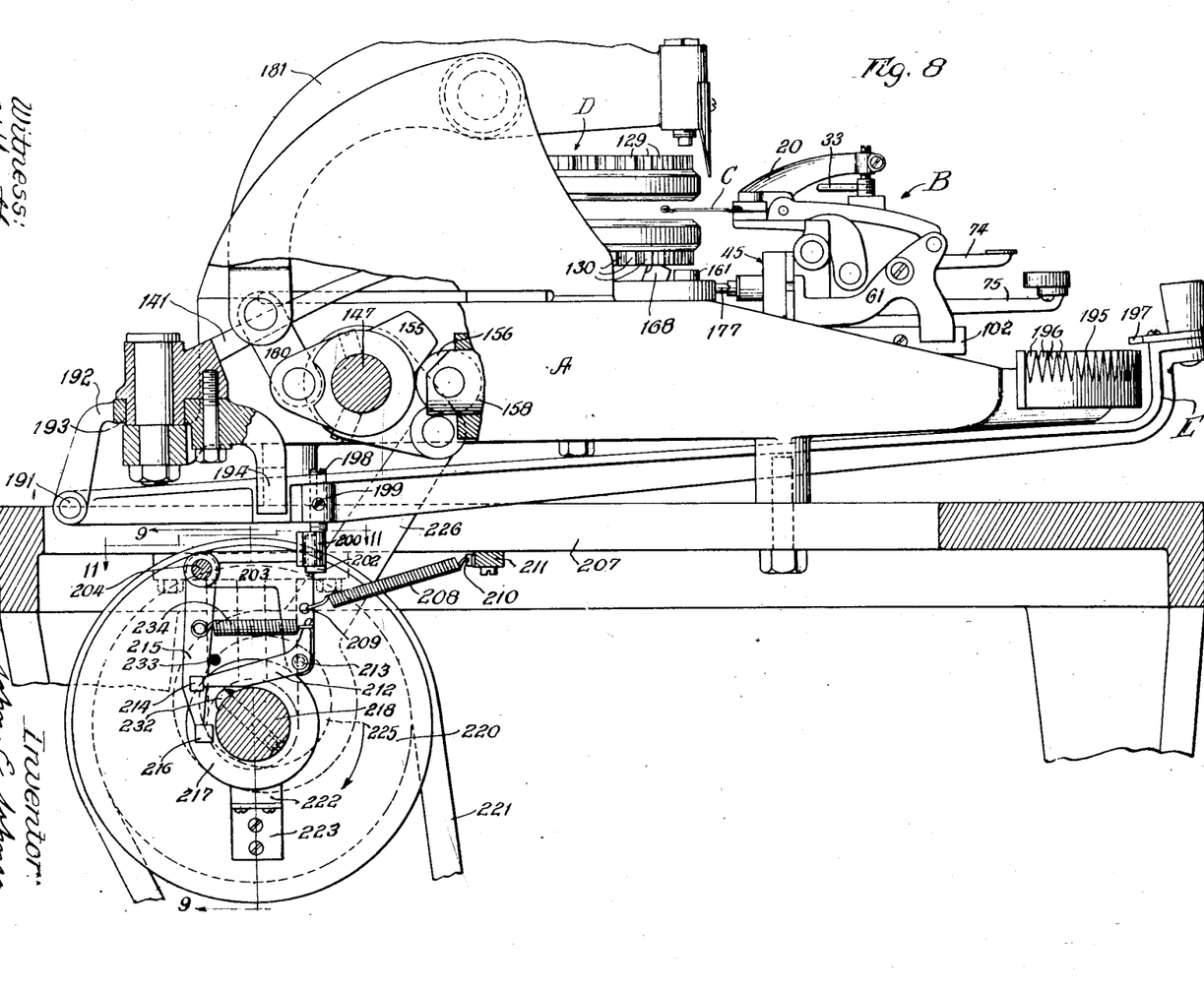
Fig. 8 is a side elevation view of a machine similar to that shown in Fig. 1, but adapted for power operation.
Figure 9:
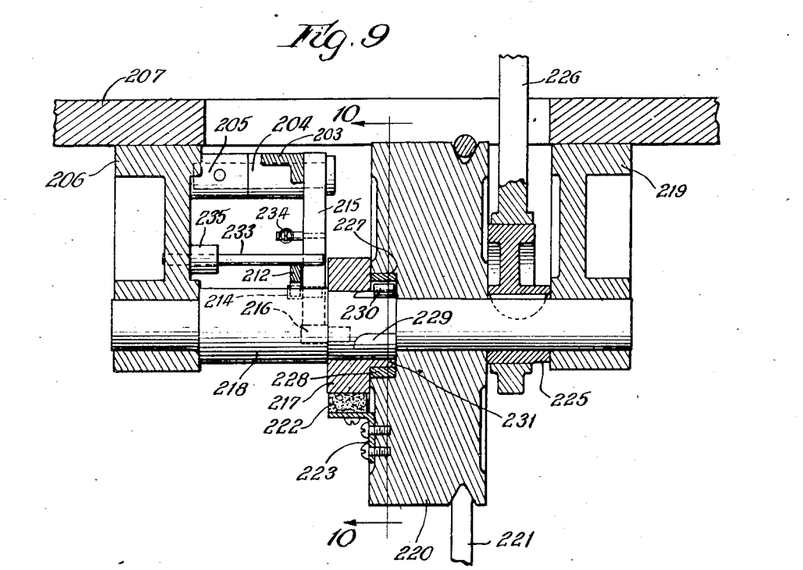
Fig. 9 is a sectional view on the line 9—9 of Fig. 8.
Figure 10:
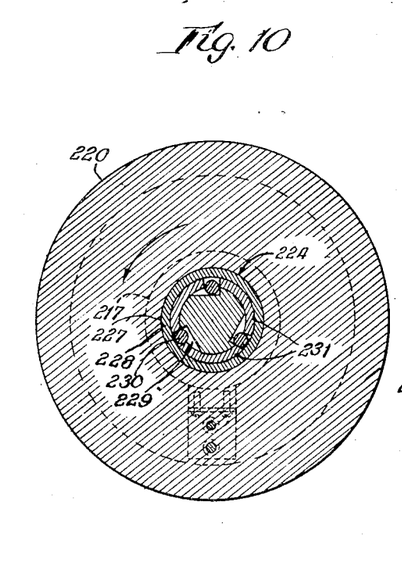
Fig. 10 is a sectional view on the line 10—10 of Fig. 9.
Figure 11:
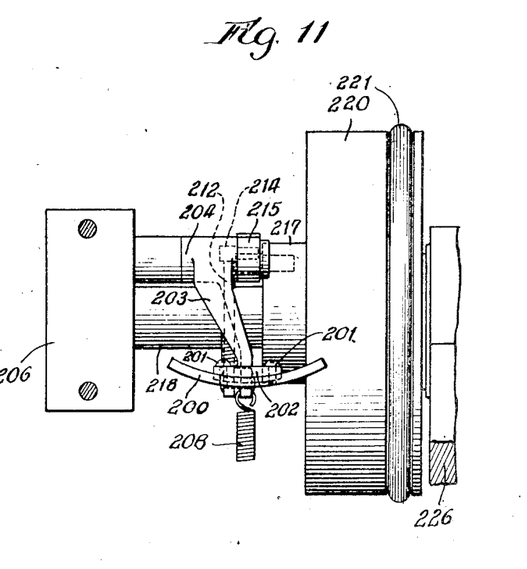
Fig. 11 is a sectional plan view substantially on the line 11—11 of Fig. 8.

The lever —E'— is provided with an adjustable screw 198 fixed therein by a set screw 199. The adjustable screw 198 is adapted for contacting with an arcuate shaped rod 200 (Fig. 11), which is fixed by screws 201, to a lug 202 extending from a bell crank 203. The bell crank 203 is pivotally mounted upon a stub shaft 204 (Figs. 8 and 9). The stub shaft 204 may be mounted in a boss 205, extending from a hanger 206 which is fixed to a supporting bench 207, or similar structure, upon which the entire device is mounted. The lever —E'— is normally retained in its elevated position, as shown in Fig. 8, by the coil spring 208 attached at one end 209 to the bell crank 203 and at its other end 210 to a lug 211 upon the supporting bench 207. A pawl member 212 centrally pivoted at 213 to the lower end of the bell crank 203 engages a pawl 214 mounted upon a lever 215, which in turn is pivoted upon the stub shaft 204. As the lever —E'— is depressed, thus depressing the bell crank 203, the pawl member 212 serves to thrust the lever 215 out of contact with a pawl 216, thus releasing the pawl 216 and an attached collar 217 (Fig. 9), for rotation about a shaft 218. The shaft 218 is mounted in the hangers 206 and 219 and a pulley 220 is mounted thereon. The pulley 220 is provided with a belt 221 designed to be constantly driven by any suitable source of power. A block of wood or similar frictional material 222 is mounted upon the pulley 220 by a bracket 223 and is thereby held in frictional engagement with the collar 217 and serves to rotate this collar at such times as the pawl 216 is released, as above described. As the collar 217 starts rotating when the pawl 216 is released, a clutch mechanism 224 as shown in Fig. 10. comes into operation and fixes the pulley 220 in relation to the shaft 218. The shaft 218 is provided with an eccentric 225 fixed thereto and having a connecting rod 226 which is attached to the crank —F— in a manner similar to the manually operated handle, as shown in Fig. 1.

The clutch mechanism 224 of Fig. 10 will now be described. The pulley 220 is provided with a recess 227 having a peripheral wall formed of a hardened ring member 228, fixed therein. The shaft 218 is provided at this point with a plurality of teeth or slots 229, as shown, into each of which are placed cylindrical rollers 230. The rollers 230 are loosely retained in the positions shown by extensions 231 formed upon the collar 217. When the collar 217 is held stationary by the pawl 216, the shaft 218 also being stationary, the cylindrical rollers 230 will be provided with sufficient space at the base of slots 229 so that they will not tend to grip the shaft 218 and ring member 228 and consequently the revolving pulley 220 will not impart rotation to the shaft 218. However, when the collar 217 is released for rotation, the rollers 230 will be forced by extensions 231 to ride up on the inclined surface of the teeth or slots 229 and thus come firmly into contact both with the surfaces of the teeth and with the interior wall of ring members 228 fixed in the pulley 220. Consequently, the shaft and pulley will now be fixed in respect to each other and will rotate together.

Thus it will be seen that depressing the lever —E'— effects the release of collar 217 and permits the pulley 220 to rotate the shaft 218 and eccentric 225 which in turn actuates the crank —F—. The embossing mechanism will consequently be actuated in a manner similar to the actuation of the manually operated device of Fig. 1, above described.

In order to prevent the continued actuation of the embossing mechanism after the first complete stroke, the shaft 218 is provided with a knob 232 (Fig. 8) which upon rotation of the shaft serves to raise the pawl member 212 to a height sufficient to prevent its interference with the proper return of lever 215 into contact with a peg 233 and thus in position to prevent further rotation of the collar 217 by contacting with the pawl 216. The peg 233 may be fixed upon the hanger 206 in the boss 235. The coil spring 234 serves to retain the lever 215 and pawl member 212 in their normal positions, as shown.

While I have thus described one form of the invention and the specific manner of applying the same to practice, I do not wish to be limited in all respects to the specific details thus shown and described, since it is obvious that various changes and alterations may be made therein without departing from the scope or principles of the invention.

Having thus described my invention what I claim as new and desire to secure by Letters Patent in the United States, is:

1. In an embossing machine, a die holding member, a substantially vertical pin having a yoke pivoted thereon, said yoke having an arm, a substantially horizontal lever pivotally mounted on said arm, said yoke also having a forked arm opposite said first named arm and embracing said lever, means fixed to said yoke for positioning said die holding member in response to horizontal oscillation of said lever, and means positioned adjacent said lever and actuated by vertical oscillation thereof for controlling power to operate the dies.

2. In an embossing machine, a die holding member, a substantially vertical pin mounted at one side of the machine and having a yoke pivoted thereon, said yoke being provided with an arm having a substantially horizontal pivot at its end, a lever mounted on said pivot and extending beneath the machine to another side thereof, said yoke being also provided with a forked arm opposite said first named arm and embracing said lever, means fixed to said yoke for positioning said die holding member, and means for controlling power to operate the dies positioned beneath said lever and actuated thereby.

3. In a machine of the class described, a drive shaft, a clutch mechanism for engaging said shaft, a portion of said clutch mechanism being normally fixed but having frictional engagement with another normally rotating portion, means for normally retaining said clutch mechanism in disengaged condition, said means comprising a lever contacting with and retaining the normally fixed portion of said clutch mechanism against rotation with the normally rotating portion, and means for placing said clutch in engaged condition comprising a pawl member and a locking member, said pawl member displacing said lever to permit the normally fixed portion of said clutch mechanism to rotate and said locking member positively locking said normally rotating portion to said shaft.

4. In a machine of the class described, a drive shaft, a clutch mechanism for engaging said shaft, a portion of said clutch mechanism being normally fixed but having frictional engagement with another normally rotating portion, means for normally retaining said clutch mechanism in disengaged condition, said means comprising a lever contacting with and retaining the normally fixed portion of said clutch mechanism against rotation with the normally rotating portion, means for placing said clutch in engaged condition comprising a pawl member for displacing said lever to permit the normally fixed portion of said clutch mechanism to rotate, and means on said shaft for moving said pawl to an inactive position after the engagement of said clutch mechanism and the rotation of said shaft.

5. In an embossing machine, a flat die holding member, and a plurality of dies at the edge of said member, each of said dies being formed with an elongated slot along one of its sides, each of said dies also being accompanied by a U-shaped spring formed of flat flexible material, one arm of said U-shaped spring being fixed upon said member and extending into engagement with one end of said slot, the other arm of said spring extending into engagement with the opposite end of said slot.

6. In an embossing machine, a base member, a horizontally rotatable die holding disc mounted upon said base member, means in said base member for operating dies held in said disc, said means comprising an oscillatable shaft, and a plurality of plungers slidably mounted in said base member and operatively associated with said shaft.

7. In an embossing machine, a base member, a horizontally rotatable die holding disc mounted upon said base member, means in said base member for operating dies held in said disc, said means comprising an oscillatable shaft, a plurality of plungers slidably mounted in said base member and operatively associated with said shaft, mechanism for locking said disc in position during actuation of the dies, said mechanism comprising a toothed element fixed to said disc, and a lever for engaging said toothed element, said lever being operated by engagement with one of said plungers.

8. In an embossing machine, a base member, a horizontally rotatable die holding disc mounted upon said base member, means in said base member for operating dies held in said disc, said means comprising an oscillatable shaft, a plurality of plungers slidably mounted in said base member and operatively associated with said shaft, carriage mechanism on said base member for adjustably supporting the material to be embossed, and means comprising a rod extending from one of said plungers and operatively associated with said carriage mechanism for advancing the carriage with each actuation of the dies.

9. In an embossing machine, a base member, a horizontally rotatable die holding disc mounted upon said base member, means in said base member for operating dies held in said disc, said means comprising an oscillatable shaft, a plurality of plungers slidably mounted in said base member and operatively associated with said shaft, carriage mechanism on said base member for adjustably supporting the material to be embossed, means comprising a rod extending from one of said plungers and operatively associated with said carriage mechanism for advancing the carriage with each actuation of the dies, mechanism for locking said disc in position during actuation of the dies, said mechanism comprising a toothed element fixed to said disc, and a lever for engaging said toothed element, said lever being controlled by the die operating means.

10. In an embossing machine, a base member, carriage mechanism on said base member for adjustably supporting the material to be embossed, a die holding disc mounted on said base member, means comprising a plunger for operating dies held in said disc, and means comprising a rod extending from said plunger and operatively associated with said carriage mechanism for advancing the carriage with each actuation of the dies.

11. In an embossing machine, a base member, a carriage on said base member for adjustably supporting the material to be embossed, means including a spacing lever for permitting advancement of said carriage by independent manual operation, a die holding disc mounted on said base member, reciprocating means for operating dies held in said disc and means extending from said reciprocating means for engaging and operating said spacing lever for advancing the carriage with each actuation of the dies.

12. In an embossing machine, a base member, a horizontally rotatable die holding disc mounted upon said base member, means in said base member for operating dies held in said disc, said means comprising an oscillatable shaft, a cam on said shaft, a substantially horizontal spring pressed plunger reciprocated by said cam, and a substantially vertical spring pressed plunger reciprocated by contact with said first named plunger, said vertical plunger effecting the actuation of the dies.

13. In an embossing machine, a base member, a horizontally rotatable die holding disc mounted upon said base member, means in said base member for operating dies held in said disc, said means comprising an oscillatable shaft, a cam on said shaft, a substantially horizontal spring pressed plunger reciprocated by said cam, a substantially vertical spring pressed plunger reciprocated by said first named plunger, said vertical plunger effecting the actuation of the dies, mechanism for locking said disc in position during actuation of the dies, said mechanism comprising a toothed element fixed to said disc, and a lever for engaging said toothed element, said lever being controlled by the die operating means.

14. In an embossing machine, a die holding member comprising a pair of superimposed rotatable discs, a plurality of positive dies retained on one of said discs and a plurality of corresponding negative dies retained on the other of said discs, means for actuating said dies comprising an oscillatable shaft, a die depressing arm for effecting the actuation of the dies on one of said discs, means operatively associating said shaft with said arm, a series of reciprocating members for effecting the actuation of the dies on the other of said discs, and means operatively associating said shaft with said series of reciprocating members.

15. In an embossing machine, a die holding member comprising a pair of superimposed rotatable discs, a plurality of positive dies retained on one of said discs and a plurality of corresponding negative dies retained on the other of said discs, a base member upon which said discs are mounted in substantially horizontal position, means for actuating said dies comprising an oscillatable shaft mounted in said base member below said discs, a depressing arm for effecting the actuation of the dies on the upper of said discs, said arm having a portion extending downwardly past the edges of said discs and operatively associated with said shaft, a substantially horizontal plunger operatively associated with said shaft and slidably mounted in said base beneath said discs, and a substantially vertical plunger operated by said horizontal plunger for effecting the actuation of the dies on the lower of said discs.

16. In an embossing machine, a frame member having a substantially circular rear portion, a horizontally mounted rotatable die holding disc member mounted centrally of said portion, means for turning said disc member pivoted on said circular portion and provided with spaced arms extending toward said disc member, and a die depressing arm mounted over said disc member and having an extension passing downwardly between said spaced arms to a point within said frame member.

17. In an embossing machine, a slidable carriage member, a rack bar having oppositely disposed racks along its sides, said bar being fixed upon said carriage member, a releasing lever having a pawl normally engaging one of said racks, a spacing lever coaxially mounted with said releasing lever and having a pawl for engaging the other of said racks but normally spaced therefrom, a spring for pressing said releasing lever into contact with said spacing lever, and a spring for retaining said spacing lever in normal position.

18. In an embossing machine, a slidable carriage member, a rack bar having oppositely disposed racks along its sides, said bar being fixed upon said carriage member, a releasing lever having a pawl normally engaging one of said racks, a spacing lever coaxially mounted with said releasing lever and having a pawl for engaging the other of said racks but normally spaced therefrom, a spring for pressing said releasing lever into contact with said spacing lever, a spring for retaining said spacing lever in normal position, and a pin operatively connected to the embossing mechanism of the machine and engaging said spacing lever at each actuation of the embossing mechanism.

19. In an embossing machine, a base member, a plurality of spaced parallel rods mounted on said base member, a carriage member slidably mounted upon said rods, means for sliding said carriage member along said rods comprising a rotatable shaft, mechanism for turning said shaft, and a plurality of levers fixed to said shaft, said levers being provided with pin and slot connections with said carriage.

20. In an embossing machine adapted for power or manual operation and having a rotatable die holding disc member, a horizontally oscillatable lever for turning said die holding disc member when the machine is manually operated, said lever being removable when the machine is power operated, and replaceable by a mounting means carrying a lever oscillatable in a vertical plane for controlling power for operating the dies and oscillatable in a horizontal plane for turning said die holding disc member.

In witness whereof, I have hereunto subscribed my name.

JOHN E. JOHNSON.